United States Patent [19]

Feldman

[11] 3,721,804
[45] March 20, 1973

[54] APPARATUS FOR SEALING AND SHRINKING PLASTIC FILM

[75] Inventor: Rubin Feldman, Creve Coeur, Mo.

[73] Assignee: Tsi, Inc., St. Louis, Mo.

[22] Filed: Dec. 16, 1970

[21] Appl. No.: 98,740

[52] U.S. Cl. ..................219/388, 34/225, 53/184
[51] Int. Cl. ..........................B65b 53/02, F27b 9/10
[58] Field of Search ..53/30, 184, 373; 219/343, 377, 219/388; 34/216, 225, 233; 198/198, 202

[56] References Cited

UNITED STATES PATENTS

| 3,577,866 | 5/1971 | Ehrenfried et al. | 53/184 |
| 3,362,128 | 1/1968 | James | 53/30 X |
| 3,257,542 | 6/1966 | Hultgren | 219/343 X |
| 3,222,800 | 12/1965 | Siegel et al. | 53/184 X |
| 3,378,989 | 4/1968 | Denker | 53/184 |

FOREIGN PATENTS OR APPLICATIONS

| 512,167 | 8/1939 | Great Britain | 219/377 |
| 1,204,013 | 9/1970 | Great Britain | 53/184 |

Primary Examiner—Robert C. Riordon
Assistant Examiner—Eugene F. Desmond
Attorney—Polster and Polster

[57] ABSTRACT

An apparatus for heating packages has two heating elements arranged to provide a high temperature environment for packages wrapped in heat shrinkable film. A first heating element seals the package. A second heating element is enclosed in a heat tunnel and positioned above and laterally displaced from the first element. Heat is directed downwardly by a reflector or by a reflector-fan combination. A belt conveyor carries packages over the first heating element and through the heat tunnel. The conveyor has a lengthwise protrusion along its interior surface, through the full length of the closed belt. Spring loaded rollers at each end of the conveyor have annular notches or channels the sides of which engage the protrusion and prevent belt slippage.

13 Claims, 10 Drawing Figures

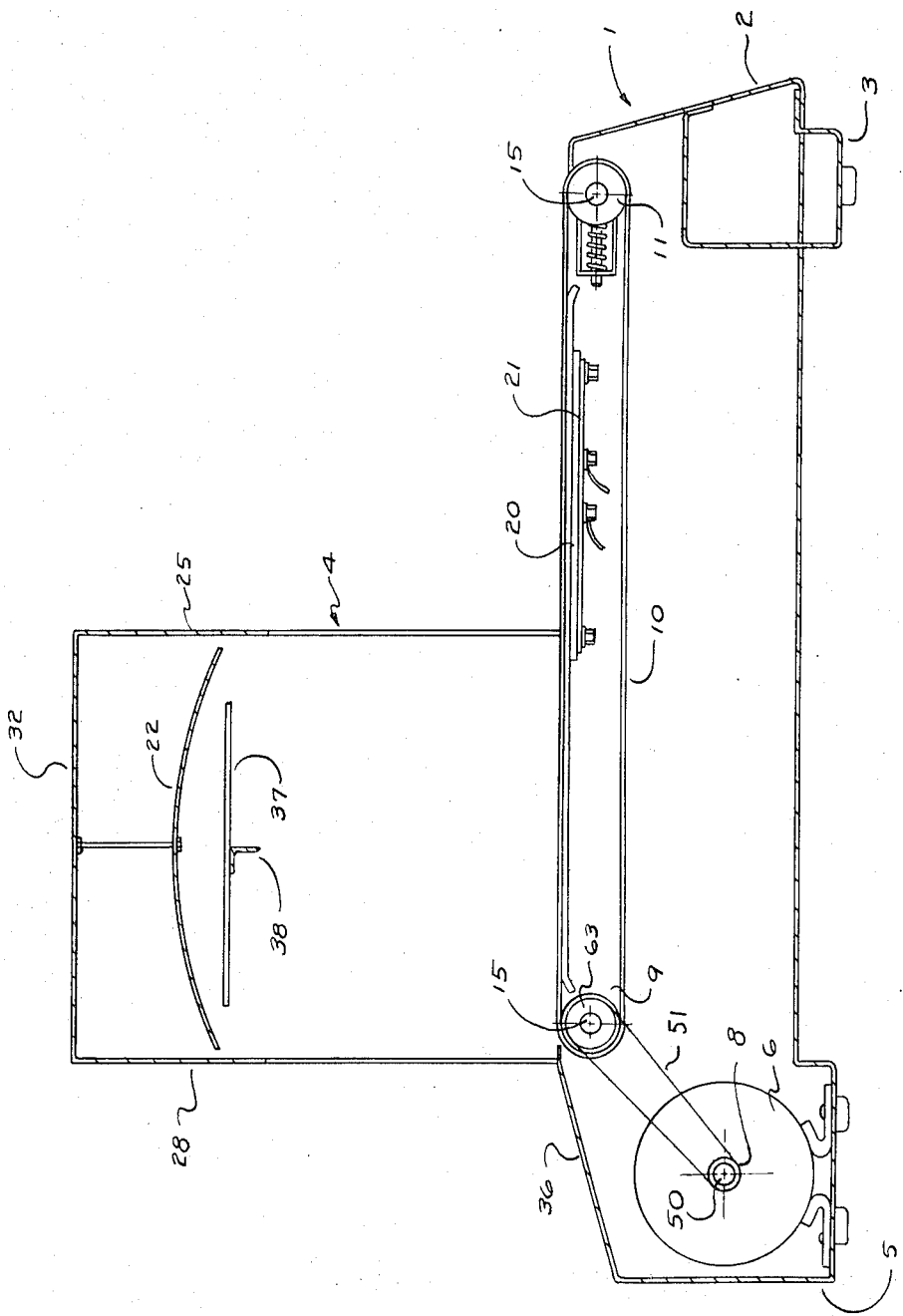

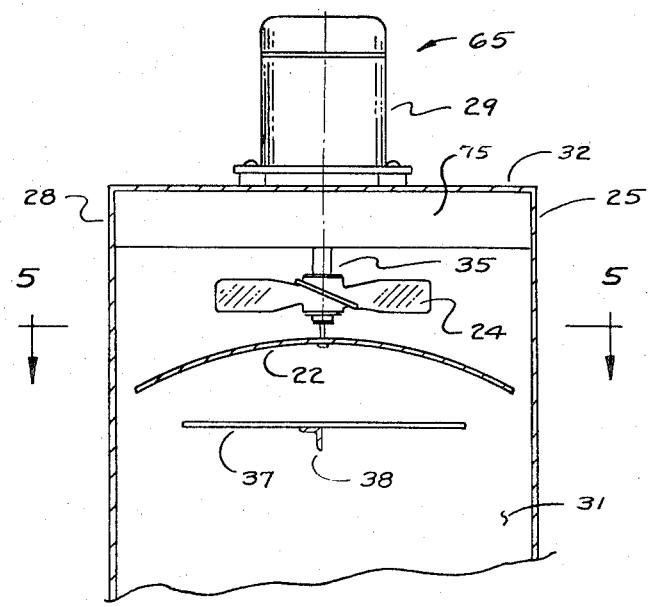
Fig -2-
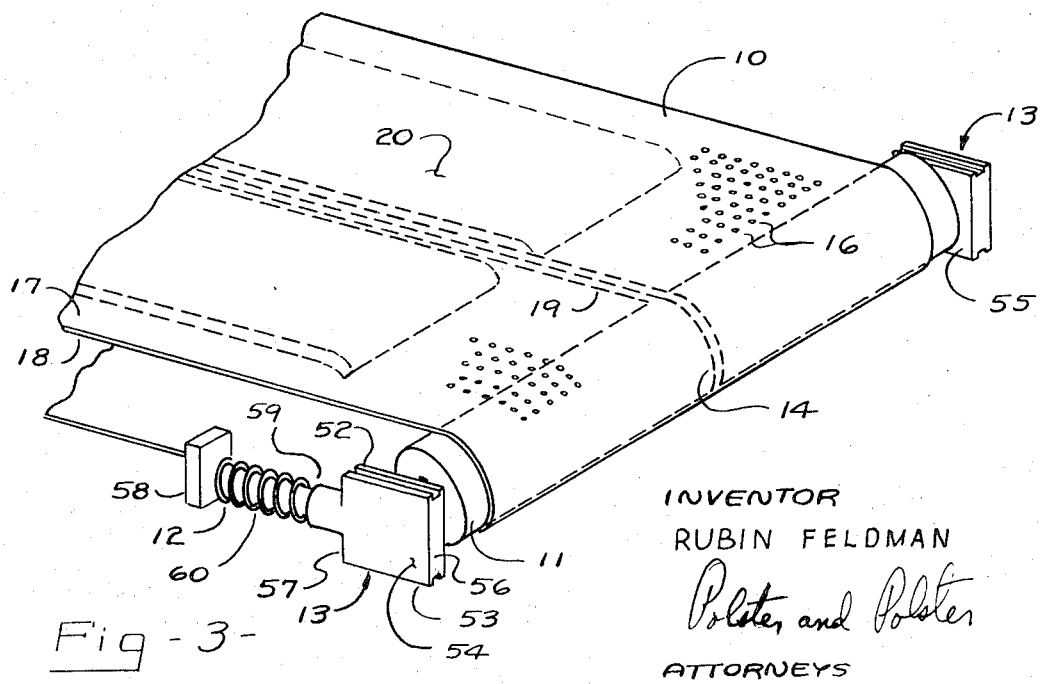
Fig -3-
INVENTOR
RUBIN FELDMAN
Polster and Polster
ATTORNEYS

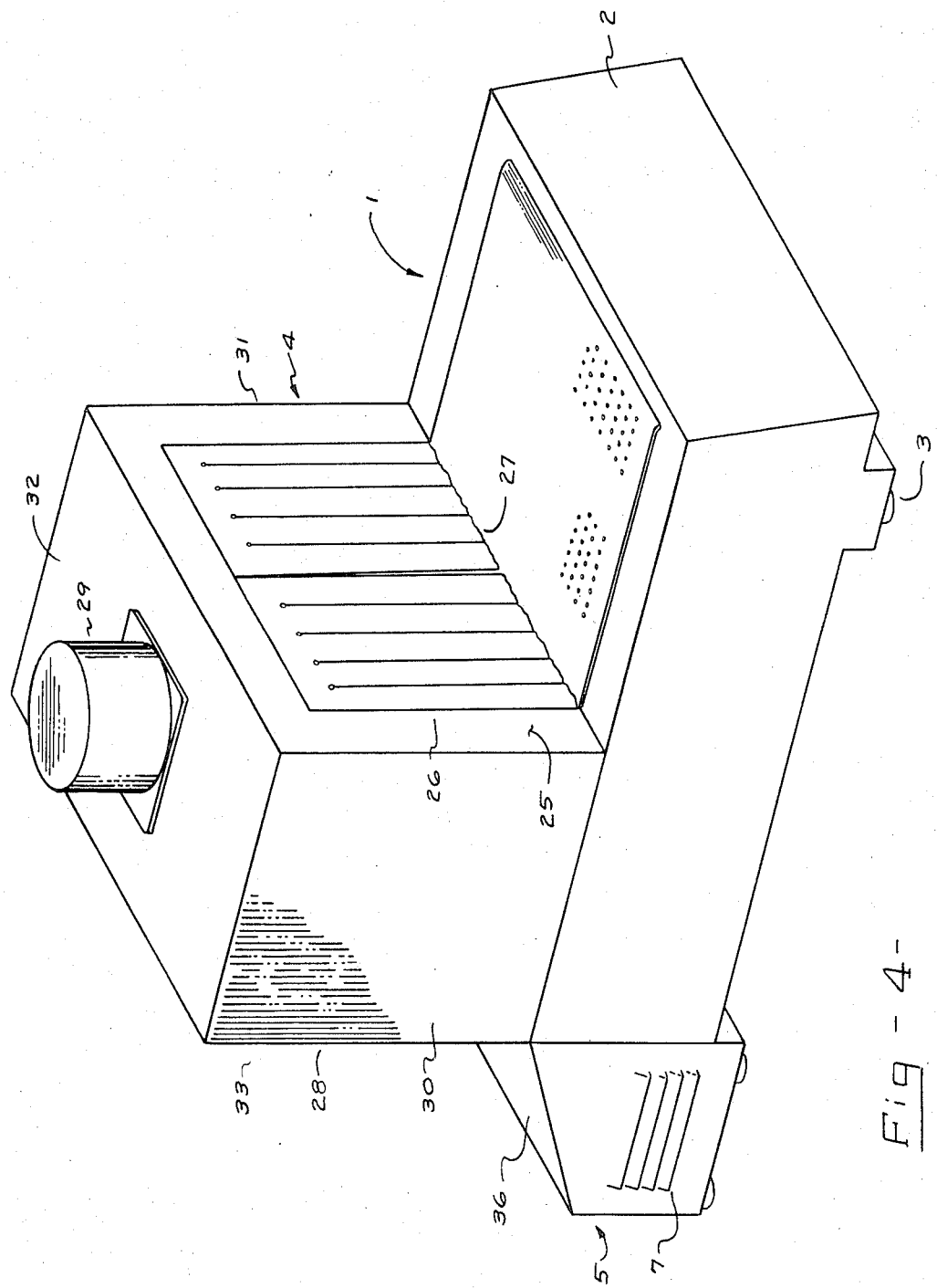
Fig-4-
INVENTOR
RUBIN FELDMAN
ATTORNEYS

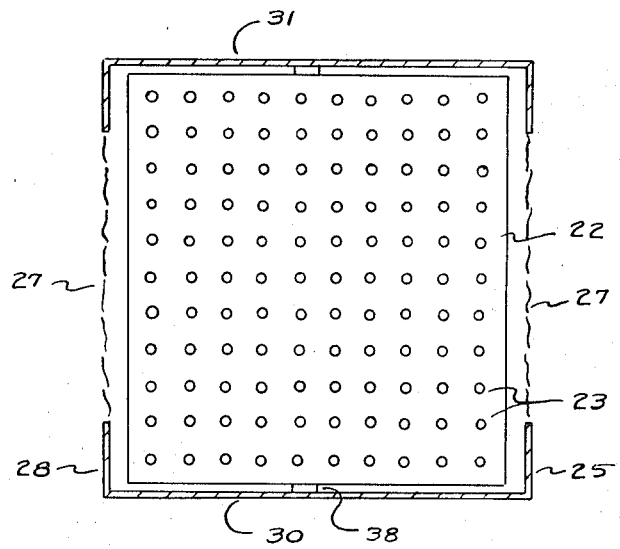
Fig-5-
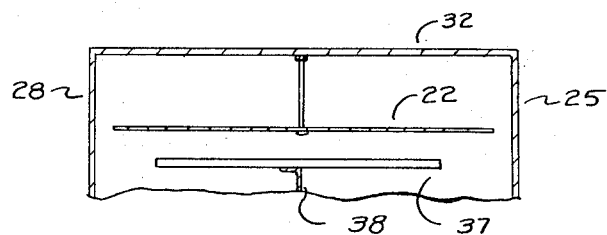
Fig-6-
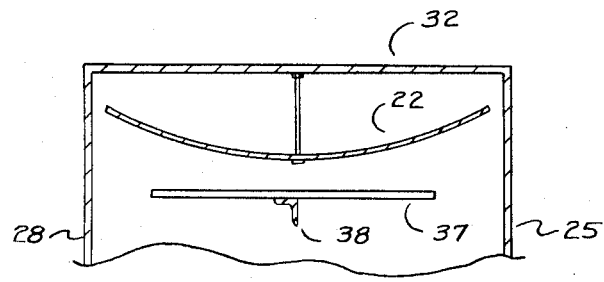
Fig-7-

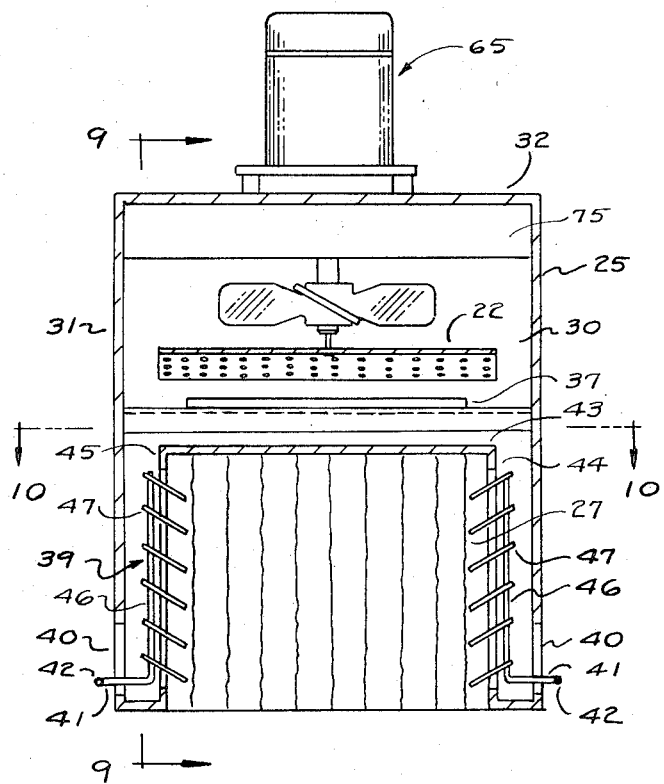
Fig-8-
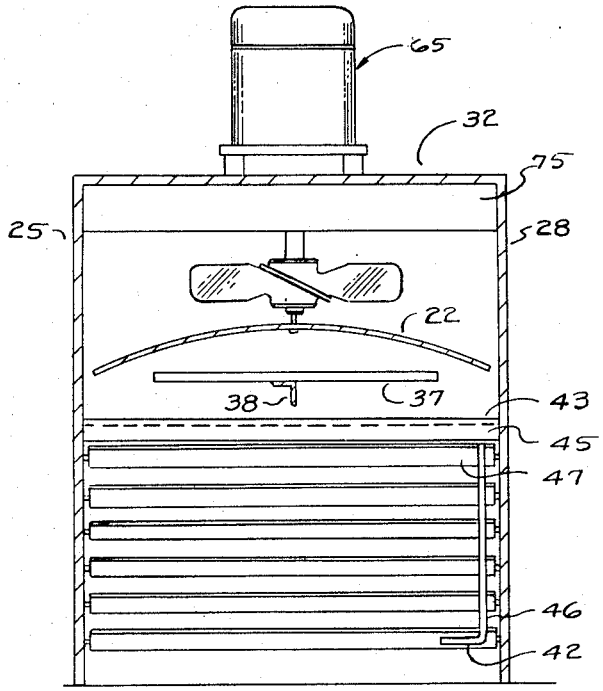
Fig-9-
INVENTOR
RUBIN FELDMAN
ATTORNEYS

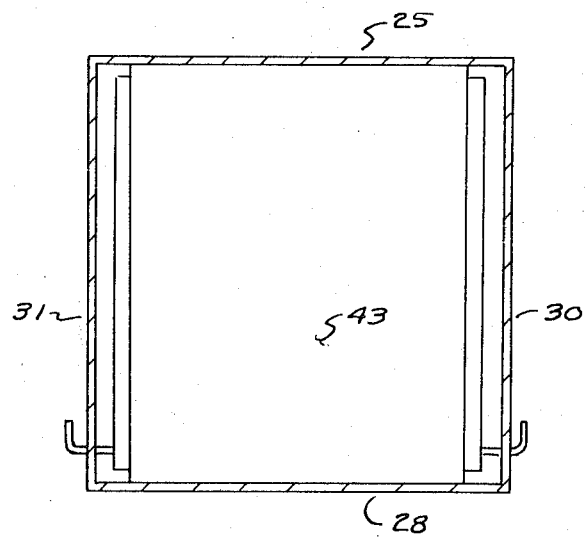
Fig -10-

APPARATUS FOR SEALING AND SHRINKING PLASTIC FILM

BACKGROUND OF THE INVENTION

This invention relates to packaging machines and in particular to machines which seal and shrink plastic film.

The prior art provides a number of apparatuses which heat shrink and seal plastic film, and one such apparatus is described in the patent to Yates, U.S. Pat. No. 3,389,530. In general, the prior art also has produced machines which automatically wrap the article in addition to shrinking the film wrap. When simultaneous wrapping occurs, the machines necessarily are complicated and have a high manufacturing and retail cost. The size and nature of the operation of these machines preclude their wide scale use. Where the apparatus is less complicated in design, as in the Yates patent cited above, a number of deficiencies arise. For example, conveyor belt heating during machine operation results in belt expansion. Frequently, the belt then slips off the drive rollers. Additionally, prior art machines, as a class, are slow in operation and require comparatively long warm-up and processing times. My invention corrects these prior art defects in a simple, low cost design.

One of the objects of this invention is to provide a packaging apparatus having a fast seal and shrink cycle for heat shrinking plastic film about an object.

Another object of this invention is to provide a packaging apparatus that is low cost and maintained easily for heat shrinking plastic film about an object.

Another object of this invention is to provide a conveniently sized packaging apparatus, suitable for use by low volume users of shrinkable film, for heat shrinking plastic film about an object.

Other objects will become apparent to those skilled in the art in light of the following description and accompanying drawings.

SUMMARY OF THE INVENTION

In accordance with this invention, generally stated, an apparatus for sealing objects in shrinkable film is provided having a first heating element which heats a base plate to sealing temperature. A conveyor carries articles across the base plate. A heat tunnel has a second heating element spatially mounted above the conveyor and laterally removed from the first heating element. The combined action of the heating elements provides quick package sealing and 360° heat shrink coverage.

The preferred embodiment utilizes notched rollers at each end of the conveyor. The notches engage a protrusion along the conveyor's interior surface. The rollers are spring loaded and self adjust for belt expansion and contraction.

BRIEF DESCRIPTION OF THE DRAWINGS

In the drawings,

FIG. 1 is a side view in section of one illustrative embodiment of apparatus of this invention;

FIG. 2 is a side view in section, partly broken away, of a second illustrative embodiment of a heat tunnel for apparatus of this invention;

FIG. 3 is a view in perspective, partly broken away, of the forward conveyor roller and mounting for apparatus of this invention;

FIG. 4 is a view in perspective of an enclosure for apparatus of this invention;

FIG. 5 is a sectional view taken along the line 5—5 of FIG. 2;

FIG. 6 is a side view in section, partly broken away, of a third illustrative embodiment of a heat tunnel for apparatus of this invention;

FIG. 7 is a side view in section, partly broken away, of a fourth illustrative embodiment of a heat tunnel for apparatus of this invention;

FIG. 8 is a side view in section of yet another illustrative embodiment of a heat tunnel for apparatus of this invention;

FIG. 9 is a sectional view taken along the line 9—9 of FIG. 8; and

FIG. 10 is a sectional view taken along the line 10—10 of FIG. 8.

DESCRIPTION OF THE PREFERRED EMBODIMENT

Referring now to FIG. 1, reference numeral 1 indicates a heat wrap machine having an enclosure 2. Enclosure 2 generally is rectangular and has two supports 3 at each forward corner. Supports 3 are conventional and may vary considerably in design. Stamped metal brackets work well in the preferred embodiment.

Enclosure 2 also includes a heat tunnel 4 and a motor housing 5. Motor housing 5 contains a motor 6 secured to or mounted on the housing by any convenient method. Resilient rubber mountings work well. Housing 5 has a plurality of air vents 7 in it, as illustrated in FIG. 4. Vents 7 permit air circulation while motor 6 is in operation. Housing 5 also functions as the rear support for enclosure 2.

While the preferred embodiment utilizes an enclosed motor, other embodiments have a motor attached to enclosure 2 externally. Either arrangement is satisfactory, so long as motor 6 is positioned away from the heat sources of the apparatus. When motor 6 is mounted on the outside of enclosure 2, additional supports, like supports 3, are used at the rear corners of enclosure 2. Supports 3, tunnel 4 and motor housing 5 may be constructed individually and intermounted by conventional means or portions thereof may be integrally constructed.

Motor 6 is conventional and has a shaft 50 with a drive wheel 8 attached thereto. A belt 51 runs between wheel 8 and a pulley wheel 63 mounted on one end of a first roller 9. Pulley wheel 63 is conventional and is attached to an axially extending arm 15 of roller 9 by common means, for example, set screws. The diameters of wheel 8 and pulley 63 are preselected to obtain desired roller 9 rotational speed. Pulley 63 and wheel 8 additionally may be grooved to enable use of a Vee belt when that belt construction form is utilized for belt 51. Arm 15 of roller 9 is journalled in bearing blocks mounted to enclosure 2. A conveyor belt 10 in turn is mounted on and extends between roller 9 and a second roller 11. The system thus described is the basic transport means for the apparatus of my invention.

Either roller 9, roller 11, or both may be spring loaded. The embodiment illustrated in FIG. 3 uses spring loading on roller 11. A loading system, including a spring 12 and a block 13 on each side of roller 11, acts to maintain roller 11, and thus conveyor belt 10, under a predetermined tension.

Block 13 is a rectangular solid body having a top 52, a bottom 53, two sides 54 and 55, and two edges represented by numerals 56 and 57. Any common slidable mounting may be used in conjunction with block 13. For example, top 52 and bottom 53 may be grooved to enable block 13 to ride a track. Other conventional arrangements work well. It is important to provide for lateral as well as axial movement if removably mounted rollers are desired. This is accomplished easily, in the preferred embodiment, by providing an opening in the track where block 13 may be disengaged from roller 11.

Spring 13 is compressed between a stop 58 and block 13. Stop 58 may be a flange struck from enclosure 2, or a separate brace. The preferred embodiment also employs a rabbeted catch 59 attached to edge 57 and a mounting tube 60 attached to stop 58 to hold spring 12 in proper position.

Rollers 9 and 11 are cylindrical and each has a notch 14 in it. Notch 14 is important in preventing belt slippage. Its operation is described fully hereinafter. Both rollers preferably have loading arms 15 extending axially outwardly from their ends. Side 55 of block 13 has a receptacle (not shown) in it, which engages roller 11 along arm 15 to spring load the roller. The receptacle is a closed bottomed, circular socket in block 13, having a diameter larger than that of arm 15.

Conveyor belt 10 is an endless belt-conveyor type constructed from or coated with an insulative material. Asbestos coating works well in preventing heat corrosion of belt 10. Conveyor 10 has an upper surface 17 and a lower surface 18. A U-shaped protrusion 19 extends from lower surface 18, is attached thereto or made a part thereof, and extends through the full length of the internal closed loop conveyor belt. Protrusion 19 is important as it rides within notch 14 in rollers 9 and 11, preventing belt runoff and insuring positive belt tracking along the rollers. Conveyor 10 also has a plurality of openings 16 in it, from and through surfaces 17 and 18. Openings 16 permit heat passage from a plate 20 to upper surface 17 of conveyor 10.

Plate 20 is positioned immediately beneath conveyor 10 and is secured to enclosure 2 by any convenient method. Common brackets work well. Plate 20 runs substantially the length of conveyor 10. Plate 20 is either split or grooved along its entire length to permit passage of protrusion 19 and is constructed from heat conductive material.

A first heating element 21 is attached to the forward end of plate 20 as is best demonstrated by FIG. 1. Element 21 is electrically connected to an electrical power source not shown. Even though element 21 abuts only a portion of plate 20, I have found that the entire upper surface 17 of conveyor 10 remains at or above film sealing temperature. This factor enables my apparatus to seal and shrink film simultaneously, resulting in a short packaging cycle time.

Heat tunnel 4 is a rectangular, box-like structure having a front wall 25, a back wall 28, side walls 30 and 31, and a top wall 32. As previously indicated, tunnel 4 may be constructed separately and later secured to enclosure 2. However, tunnel 4 and enclosure 2 may be constructed integrally if so desired. Front wall 25 and back wall 28 have openings 26 and 33 in them. A pair of curtains 27 is suspended from top wall 32, across each opening, by any convenient method. Curtain pair 27, preferably composed of heat resistive material, is cut in strips. Curtain pair 27 permits easy ingress and egress of plastic film enclosed packages while maintaining a barrier to heat escape from tunnel 4.

A reflector 22 is attached to tunnel 4 by any convenient method. Brackets work well in the illustrated embodiments. Reflector 22 may have a plurality of openings 23 in it. Reflectors having openings in them are adaptable to particular heat tunnel variations described hereinafter. Reflector 22 also may assume a variety of configurations. Generally, I have found that curvilinear designs and particularly parabolic shapes, either concave to focus heat or convex to disperse it, work well. However, even a flat heat reflective surface functions satisfactorily. Various shaped reflectors are illustrated in FIGS. 2, 6 and 7.

A second heating element 37 is positioned beneath reflector 22, above conveyor 10. Heating element 37 is electrically connected to a source of electrical power not shown. Heating element 37 is mounted in tunnel 4 by one or more angle irons 38. Angle irons 38 are attached to the side walls of tunnel 4.

It is convenient to slope enclosure 2 downwardly from wall 28 of tunnel 4, to form an incline 36. Packages leaving tunnel 4 slide along incline 36 from which they may be removed by the machine operator.

A major variation in the heat tunnel of this apparatus is indicated by comparing FIGS. 1 and 2. FIG. 2, among other variations, displays a fan assembly 65. Fan assembly 65 includes a motor 29 mounted on top wall 32 by conventional mounting means, for example bolts. Motor 29 has a shaft 35 extending through wall 32. An insulation layer 75 protects motor 29 from the high temperature in tunnel 4. A fan blade 24 is secured to the free end of shaft 35. Certain commercial applications of my invention are satisfied by the tunnel 4 construction illustrated in FIG. 1. Where desired, however, fan assembly 65 and a perforated reflector may be utilized to increase or control a forced air supply within tunnel 4.

Certain embodiments of my invention such as the embodiment illustrated in FIGS. 8-10 are provided with a selective heat control device 39 contained within tunnel 4. Control device 39 is a structure having a closed top 43, and selectively closeable side walls 44 and 45. Top 43 runs the axial length of tunnel 4 and blocks hot air flow within the tunnel except through the side walls of control device 39. In these embodiments, side walls 30 and 31 have control slots 40 in them. Slots 40 receive an L-shaped control arm 41. Arm 41 has a long leg 46 and a short leg 42. Louvers 47 are rotatably mounted to each leg 46 and side walls 44 and 45 of control device 39. Arm 41 is adapted to control louvers 47 from a closed, vertical louver position to an open, horizontal louver position. These positions of louvers 47 control the quantity of heated air entering tunnel 4. While manually controlled louvers are utilized in the embodiments illustrated, those skilled in the art will realize that conventional means to power drive louvers 47 are available.

In all of the embodiments, simple operation is provided. Upon actuation, first heating element 21 quickly heats plate 20 to sealing temperature. Because plate 20 is heat conductive, the entire plate beneath conveyor 10 and the air space between the conveyor and plate rises to sealing temperature even though heat element 21 is in actual contact with approximately half of plate 20. Meanwhile, second heating element 37 raises the temperature within tunnel 4 to shrinking temperature.

Heat radiated by element 37 strikes reflector 22 and is directed downwardly. Air within tunnel 4 rises as its temperature increases. The air flow pattern thus established provides heat coverage about the entire package, which coverage is sufficient for most heat shrink applications. Additional air volume control may be provided by fan assembly 65 or heat control device 39.

The operator merely places prewrapped packages on the conveyor, sealing surface downward. Sealing commences immediately. As the package enters the heat tunnel 4, hot air shrinks the film. Sealing continues due to the presence of plate 20 within the tunnel. The entire seal and wrap time is short, allowing the apparatus to be used even when perishable articles are wrapped.

Spring loaded rollers 9 and 11 maintain pressure on conveyor 10 as heat expands that conveyor. Even tracking of conveyor 10 is provided by the interraction of protrusion 19 and notch 14 in each roller.

The positioning of main drive motor 6 allows it to operate near its normal designed temperature. Consequently, problems due to motor heating commonly causing wire insulation breakdown, increased motor coil resistance and subsequent reduction of motor torque, and lubricant viscosity change are diminished.

As the shrink wrap packages leave conveyor 10 and tunnel 4, they slide along incline 36 where they are removed by the operator.

Numerous variations, within the scope of the appended claims, will occur to those skilled in the art in light of the foregoing description and accompanying drawings. By way of illustration, the shape of enclosure 2 or tunnel 4 may be varied. Likewise, the axial length of the apparatus or portions thereof may be altered. For example, conveyor 10 can be lengthened or operatively connected to additional conveyors to automate package handling. Various conventional aspects of the apparatus may be changed. Thus, other adjustable means may be used in conjunction with rollers 9 and 11 to provide an adjustable conveyor. Set screws are one alternative to spring loaded rollers. The number of heating elements 21 and 37 or structural design of plate 20 may be modified. Thus, the unitary heating elements described may be plural heating means. Likewise while protrusion 19 was described as preferably U-shaped, other configurations, for example, V-shaped, work well. These variations are merely illustrative.

Having thus described the invention, what is claimed and desired to be secured by Letters Patent is:

1. An apparatus for heat shrinking and sealing plastic film, which comprises:
    an enclosure;
    a base plate attached to said enclosure, said base plate having an axial groove in it which divides said base plate into first and second sections;
    first heating means mounted in heat transfer relationship to a forward portion of said base plate, on each side of said dividing groove;
    main drive means for moving an object across said base plate, said drive means including at least two rollers, one each of said rollers being rotatably mounted to said enclosure at opposite ends of said base plate, each of said rollers comprising generally cylindrical shaped bodies having a circumferential notch in them dividing said rollers into first and second sections, said notch in each of said rollers and said base plate axial groove aligned so as to define a tracking channel; an endless belt having a roller engaging surface, said belt extending between said rollers so as to be driven thereby; and a protrusion extending from said roller engaging surface of said belt, positioned so as to be carried in said tracking channel during rotation of said belt;
    means for rotating at least one of said rollers;
    a heat tunnel enclosing a second portion of said base plate;
    a reflector mounted internally of said heat tunnel above said base plate; and
    second heating means mounted internally of said heat tunnel below said reflector of said base plate.

2. The apparatus of claim 1 wherein at least one roller is spring loaded to maintain predetermined tension on said belt.

3. The apparatus of claim 2 wherein said reflector is essentially flat.

4. The apparatus of claim 2 wherein said reflector is curvilinear.

5. The apparatus of claim 2 including a fan assembly mounted on said tunnel, and directed to force air toward said base plate.

6. The apparatus of claim 5 wherein said reflector has a first and second surface having a plurality of openings therebetween, said reflector being essentially flat.

7. The apparatus of claim 5 wherein said reflector has a first and a second surface having a plurality of openings therebetween and is curvilinear.

8. The apparatus of claim 5 wherein said tunnel has a front, a back, and side walls and additionally has a control device mounted therein below said second heating element and above said base plate, said control device comprising:
    a top surface running from said front to said back and spaced inboardly of said side walls;
    two side surfaces attached to said top surface and to said enclosure; and
    means for controlling air flow through said side surfaces.

9. The apparatus of claim 8 wherein said means for controlling air flow through said side surfaces comprises manually operating louvers.

10. The apparatus of claim 9 wherein said reflector has a first and a second surface having a plurality of openings therebetween, said reflector being essentially flat.

11. The apparatus of claim 9 wherein said reflector has a first and a second surface having a plurality of openings therebetween and is curvilinear.

12. An apparatus for heat shrinking and sealing plastic film, which comprises:
    an enclosure;
    a base plate attached to said enclosure, said base plate having an axial groove approximately dividing said base plate in equal sections;

a first heating element mounted in heat transfer relationship to a forward portion of said base plate, on each side of said dividing groove;

main drive means for moving an object across said base plate, said drive means comprising at least two rollers, each of said rollers being rotatably mounted to said enclosure at opposite ends of said base plate, said rollers comprising generally cylindrical shaped bodies having a circumferential notch in them dividing said rollers in approximately equal cylindrical sections, said circumferential notch in said rollers and said axial groove in said base plate being aligned so as to define a tracking channel; an endless belt having a roller engaging surface, said belt extending between said roller so as to be driven thereby; at least one protrusion extending from said roller engaging surface of said belt, and positioned so as to be driven by said rollers whereby said protrusion passes through said tracking channel during rotation of said belt;

means for rotating at least one of said rollers;

a heat tunnel enclosing a second portion of said base plate;

a reflector mounted internally of said heat tunnel above said base plate; and a second heating element mounted internally of said heat tunnel below said reflector and above said base plate.

13. An apparatus for heat shrinking and sealing plastic film, which comprises:

an enclosure;

a base plate attached to said enclosure, said base plate having an axial groove in it which divides said base plate into first and second sections;

first heating means mounted in heat transfer relationship to a forward portion of said base plate;

main drive means for moving an object across said base plate, said drive means including at least two rollers, one each of said rollers being rotatably mounted to said enclosure at opposite ends of said base plate, each of said rollers comprising generally cylindrical shaped bodies having a circumferential notch in them dividing said rollers into first and second sections, said notch in each of said rollers and said base plate axial groove aligned so as to define a tracking channel; an endless belt having a roller engaging surface, said belt extending between said rollers so as to be driven thereby; and a protrusion extending from said roller engaging surface of said belt, positioned so as to be carried in said tracking channel during rotation of said belt;

means for rotating at least one of said rollers;

a heat tunnel enclosing a second portion of said base plate;

a reflector mounted internally of said heat tunnel above said base plate; and second heating means mounted internally of said heat tunnel below said reflector and above said base plate.

* * * * *